United States Patent
Seiferling et al.

(10) Patent No.: US 8,618,187 B2
(45) Date of Patent: Dec. 31, 2013

(54) COMPOSITION FOR FORMING A CONTACT LENS

(75) Inventors: Bernhard Seiferling, Goldbach (DE); Thomas Schmidt, Aschaffenburg (DE); Jürgen Vogt, Flüh (CH)

(73) Assignee: Novartis AG, Basel (CH)

(*) Notice: Subject to any disclaimer, the term of this patent is extended or adjusted under 35 U.S.C. 154(b) by 0 days.

(21) Appl. No.: 13/433,329

(22) Filed: Mar. 29, 2012

(65) Prior Publication Data

US 2012/0252921 A1 Oct. 4, 2012

Related U.S. Application Data

(60) Provisional application No. 61/470,569, filed on Apr. 1, 2011.

(51) Int. Cl.
*G02B 1/04* (2006.01)
*C08F 20/56* (2006.01)
*C09K 3/00* (2006.01)
*C08F 2/50* (2006.01)

(52) U.S. Cl.
USPC .......... 523/106; 522/99; 526/279; 252/183.11

(58) Field of Classification Search
None
See application file for complete search history.

(56) References Cited

U.S. PATENT DOCUMENTS

| | | | |
|---|---|---|---|
| 4,136,250 A | 1/1979 | Mueller | |
| 4,197,266 A | 4/1980 | Clark | |
| 4,486,577 A | 12/1984 | Mueller | |
| 4,565,348 A | 1/1986 | Larsen | |
| 4,605,712 A | 8/1986 | Mueller | |
| 4,645,811 A * | 2/1987 | Falcetta et al. | 526/279 |
| 4,663,409 A * | 5/1987 | Friends et al. | 526/242 |
| 4,737,558 A * | 4/1988 | Falcetta et al. | 526/279 |
| 4,923,906 A * | 5/1990 | Mueller et al. | 523/107 |
| 4,955,580 A | 9/1990 | Seden | |
| 5,034,461 A | 7/1991 | Lai | |
| 5,260,000 A * | 11/1993 | Nandu et al. | 264/2.1 |
| 5,310,779 A * | 5/1994 | Lai | 524/588 |
| 5,416,132 A | 5/1995 | Yokoyama | |
| 5,466,147 A | 11/1995 | Appleton | |

(Continued)

FOREIGN PATENT DOCUMENTS

| EP | 0367513 A2 | 10/1989 |
|---|---|---|
| WO | 8704390 A1 | 7/1987 |
| WO | 2011071791 A1 | 6/2011 |

OTHER PUBLICATIONS

Lewis J. Young "Copolymerization Parameters" Journal of Polymer Science, 54, 1961, 411-465.*

(Continued)

*Primary Examiner* — Robert S Loewe
(74) *Attorney, Agent, or Firm* — Jian Zhou (57) ABSTRACT

There is described a composition for forming an contact lens, in particular for forming a silicone hydrogel contact lens, comprising at least one first vinylic monomer or macromer having one first ethylenically unsaturated group and at least one second vinylic monomer or macromer having one second ethylenically unsaturated group, wherein the first and second ethylenically unsaturated groups are different from each other and wherein the composition further comprises a crosslinker with at least two ethylenically unsaturated (polymerizable) groups with a selected kinetic copolymerization parameter $r_1$ of less than 1.0 relative to one of the first and second ethylenically unsaturated (polymerizable) groups as defined above.

8 Claims, 3 Drawing Sheets

Formulation A

(56) References Cited

U.S. PATENT DOCUMENTS

| | | | |
|---|---|---|---|
| 5,760,100 | A | 6/1998 | Nicolson |
| 5,894,002 | A | 4/1999 | Boneberger |
| 6,169,127 | B1* | 1/2001 | Lohmann et al. ............ 523/106 |
| 6,627,124 | B1* | 9/2003 | Herbrechtsmeier et al. . 264/1.36 |
| 7,780,879 | B2 | 8/2010 | Pruitt |
| 7,851,574 | B2* | 12/2010 | Dollase et al. ................ 526/265 |
| 7,994,356 | B2* | 8/2011 | Awasthi et al. ............... 556/419 |
| 8,163,206 | B2 | 4/2012 | Chang |
| 2003/0027965 | A1* | 2/2003 | Solomon et al. ........... 526/303.1 |
| 2007/0222095 | A1 | 9/2007 | Zanini |
| 2008/0143958 | A1* | 6/2008 | Medina et al. ............ 351/160 H |
| 2008/0231798 | A1* | 9/2008 | Zhou et al. ................ 351/160 H |
| 2009/0160074 | A1* | 6/2009 | Pruitt et al. .................. 264/1.36 |
| 2009/0168013 | A1* | 7/2009 | Kunzler et al. ........... 351/160 R |
| 2010/0120938 | A1* | 5/2010 | Phelan et al. ................. 523/107 |
| 2010/0140114 | A1* | 6/2010 | Pruitt et al. .................... 206/5.1 |
| 2010/0258961 | A1* | 10/2010 | Chang et al. ................. 264/1.38 |
| 2010/0296049 | A1* | 11/2010 | Justynska et al. ......... 351/160 H |
| 2011/0134387 | A1 | 6/2011 | Samuel |
| 2012/0252921 | A1* | 10/2012 | Seiferling et al. .............. 522/99 |
| 2012/0252925 | A1* | 10/2012 | Iwata et al. ................... 523/107 |

OTHER PUBLICATIONS

PCT International Search Report dated May 31, 2012. International Application No. PCT/EP2012/055661, International Filing Date Mar. 29, 2012.

PCT Written Opinion of the International Searching Authority dated May 31, 2012. International Application No. PCT/EP2012/055661, International Filing Date Mar. 29, 2012.

* cited by examiner

COMPOSITION FOR FORMING A CONTACT LENS

This application claims the benefit under 35 USC §119 (e) of U.S. provisional application Ser. No. 61/470,569 filed on Apr. 1, 2011, incorporated herein by reference in its entirety.

The present invention generally relates to a composition for forming an ophthalmic lens, such as, an intraocular lens or a contact lens, in particular for forming a silicone hydrogel contact lens, comprising at least one first vinylic monomer or macromer having one first ethylenically unsaturated group and at least one second vinylic monomer or macromer having one second ethylenically unsaturated group, wherein the first and second ethylenically unsaturated groups are different from each other and wherein the composition further comprises a crosslinker with at least two ethylenically unsaturated (polymerizable) groups with a selected kinetic copolymerization parameter $r_1$ of less than 1.0 relative to one of the first and second ethylenically unsaturated (polymerizable) groups as defined above.

BACKGROUND OF THE INVENTION

Ophthalmic lenses, preferably contact lenses and in particular silicone hydrogel contact lenses, which it is intended to produce economically in large numbers, are preferably produced by the so-called mold or full-mold process using rigid molds. In this process, the lenses are produced in their final shape between two mold halves, so that neither subsequent machining of the surfaces of the lenses nor machining of the edge is necessary. Such molding processes are described in more detail, for example in WO-A-87/04390, EP-A-0367513 or in U.S. Pat. No. 5,894,002.

In the known molding processes, the geometry of the contact lens to be produced is defined by a mold cavity between two lens forming surfaces of two mold halves. The edge of the contact lens is likewise formed within the mold, whereby the geometry of the edge preferably is defined by a spatial limitation of UV light used for the polymerization and/or the cross-linking of a lens forming material.

In order to produce contact lenses, in particular silicone hydrogel contact lenses, usually a specific amount of a flowable lens forming material is introduced into the female mold half in a first step. The mold is then closed by putting the male mold half into place. The subsequent polymerization and/or cross-linking of the lens forming material is carried out by means of irradiation with UV light and/or by heating. In the process, either both, the lens forming material in the mold cavity and the excess material in the overflow (or so-called reservoir) are hardened, or only the lens forming material in the mold cavity is hardened, whereas the excess material in the overflow remains as "flash". In order to obtain fault-free separation of the lens from the excess material, good sealing or expulsion of the excess material must be achieved in the zone in which the two mold halves make contact with each other or in that zone, which defines the spatial limitation of the UV light used for the polymerization and/or the cross-linking of the lens forming material.

After the lens has been formed, the mold is disassembled and the lens removed. Additional processing steps, such as inspection, extraction, hydration, surface treatment and sterilization may finally be performed on the lens before packaging.

Upon polymerization and/or cross-linking of the lens forming material, shrinkage may occur, which may lead to stress in the final lens and/or may lead to delamination of the lens forming material from the mold surface during the molding process, which may result in an uneven lens surface. The problem of shrinkage upon curing (i.e. upon polymerization and/or cross-linking) of lens forming material is known in the art and has been addressed with different technical solutions, such as the following:

U.S. Pat. No. 4,197,266 discloses a method and apparatus for forming ophthalmic lenses, the apparatus comprising cooperating first and second mold surfaces to form a mold cavity. The assembled molds further comprise an annular reservoir connected with the mold cavity. In operation said reservoir provides lens forming material to the mold cavity of the lens, to compensate for shrinkage of the lens material upon curing. In particular the reservoir holds a volume of lens forming material, which during the polymer forming reaction, is kept in a flowable state longer than the lens forming material in the mold cavity.

U.S. Pat. No. 4,565,348 discloses a plastic mold assembly comprising a male and female mold section for casting soft contact lenses, wherein compensation for polymerization shrinkage is attained by providing one flexible and one rigid mold section.

U.S. Pat. No. 4,955,580 discloses a polyolefin mold for casting contact lenses from a polymerizable monomer composition which shrinks on polymerization, wherein said mold comprises male and female mold halves at least one of which has a flexible diaphragm portion which is shaped to provide a surface corresponding to a lenticular surface, said mold halves, when closed, cooperate to define a mold cavity for receiving a volume of said monomer composition, whereby in use said diaphragm is deflected into a cavity under forces exerted on said mold by said monomer composition when polymerized in said closed cavity, thereby compensating for the shrinkage occurring on polymerization.

U.S. Pat. No. 5,466,147 further provides a method and apparatus for molding lenses, such as contact lenses, which have a finished edged, wherein the one mold section comprises a deformable peripheral rim and the other mold section comprises a reversely angled deformable mating surface, so as to accommodate shrinkage during curing.

In spite of all prior art attempts shrinkage is still a problem to be addressed in the manufacture of contact lenses, in particular for silicone hydrogel contact lenses, in particular in the fully automated manufacture of contact lenses using rigid molds, and even more so in the manufacture of silicone hydrogel contact lenses using rigid molds. The present invention therefore is directed to an improved composition for forming a contact lens, in particular for forming a silicone hydrogel contact lens.

Currently almost all silicone hydrogel materials for use as contact lenses are made from formulations which contain a rather large amount of polymerizable monomers (and/or macromers). Due to the reduction in volume occupied by the polymer in comparison to the sum of monomers, the reaction mixture is shrinking in volume upon polymerization. This volume shrinkage is usually in the order of a few %, but may go up to 15% for formulations with a high content of monomers. In conventional contact lens manufacturing technology flexible mold parts are used, which are usually made from polypropylene or similar thermoplastic resins and thus are sufficiently flexible to compensate for the polymerization volume shrinkage. Another contact lens manufacturing technology (e.g. the Lightstream™ technology) uses rigid mold halves. Keeping the distance between the rigid mold parts constant during the polymerization process however may lead to partial or complete delamination of the polymerizing material from the mold surface, potentially leading to surface irregularities which may negatively affect the optical properties of the resulting contact lens.

It is thus an object of the present invention to provide an improved composition and process for forming a contact lens, in particular for forming a silicone hydrogel contact lens, which reduces or avoids surface irregularities and/or uneven lens surfaces, which occur due to shrinkage of the lens forming material upon polymerization and/or cross-linking of the lens forming material in a rigid mold. It is yet a further object of the present invention to provide a contact lens, in particular a silicone hydrogel contact lens, by making use of said composition and process.

SUMMARY OF THE INVENTION

These objects are met by a composition, contact lens, process and use in accordance with the respective independent claims. Improvements and advantageous embodiments of the composition, contact lens, process and use according to the invention are defined in the respective dependent claims.

DEFINITIONS

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. Generally, all percentages used herein are percentages by weight if not stated otherwise.

A "contact lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens.

A "hydrogel" or "hydrogel material" refers to a crosslinked polymeric material which can absorb at least about 10 percent by weight of water when it is fully hydrated.

A "silicone hydrogel" or "silicone hydrogel material" refers to a silicone-containing crosslinked polymeric material which can absorb at least about 10 percent by weight of water when it is fully hydrated and is obtained by copolymerization of a polymerizable composition comprising at least one silicone-containing vinylic monomer or at least one silicone-containing macromer or at least one crosslinkable silicone-containing prepolymer.

A "silicone hydrogel contact lens" refers to a contact lens comprising a silicone hydrogel material.

A "vinylic monomer" refers to a low molecular weight compound that has one sole ethylenically unsaturated group.

A "vinylic macromer" refers to a medium and high molecular weight compound or polymer that has one sole ethylenically unsaturated group.

"Low molecular weight" typically means average molecular weights less than 700 Daltons.

Medium and high molecular weight typically means average molecular weights greater than 700 Daltons.

"Hydrophilic," as used herein, describes a material or portion thereof that will more readily associate with water than with lipids.

A "hydrophilic vinylic monomer or macromer", as used herein, refers to a vinylic monomer or macromer which as a homopolymer typically yields a polymer that is water-soluble or can absorb at least about 10 percent by weight of water. A "hydrophobic vinylic monomer or macromer", as used herein, refers to a vinylic monomer or macromer which as a homopolymer typically yields a polymer that is insoluble in water and can absorb less than about 10 percent by weight of water.

A "crosslinker" refers to a compound or polymer that comprises two or more ethylenically unsaturated groups. A crosslinker can have a low molecular weight or a medium and high molecular weight.

A "prepolymer" refers to a medium and high molecular weight polymer that contains two or more ethylenically unsaturated groups.

A "polymer" means a material formed by polymerizing and/or crosslinking one or more monomers or macromers or prepolymers.

The term "ethylenically unsaturated group" is employed herein in a broad sense and is intended to encompass any groups containing a >C=C< group, which can be polymerized and/or crosslinked actinically or thermally. Exemplary ethylenically unsaturated groups include without limitation acryloyl, methacryloyl, allyl, vinyl, styrenyl, or other C=C containing groups. Preferably, ethylenically unsaturated groups are vinylic groups.

The term "(meth)acrylamide" refers to methacrylamide and/or acrylamide. The term "(meth)acrylate" refers to methacrylate and/or acrylate.

The term "curing" in the context of the present invention comprises polymerization and/or crosslinking of a lens forming material (or composition). Preferably the term curing herein comprises polymerization of a monomer system and/or crosslinking of a monomer, macromer or pre-polymer system, or mixtures thereof.

As used herein, "actinically" in reference to curing, crosslinking or polymerizing of a polymerizable composition (i.e. a monomer, macromer or prepolymer mixture) means that the curing (e.g., crosslinking and/or polymerizing) is performed by applying actinic radiation, such as, for example, UV radiation, ionizing radiation (e.g. electron beam, gamma ray or X-ray), microwave radiation, and the like. Preferably actinic radiation is UV radiation. Generally, thermal curing or actinic curing methods are well-known to a person skilled in the art.

An "amide-type vinylic monomer (or macromer)" refers to a vinylic monomer (or macromer) comprising one sole ethylenically unsaturated radical of in which X is a covalently bound hydrogen, or a methyl radical (—CH₃).

The term "acrylamide monomer (or macromer)" refers to a vinylic monomer (or macromer) having an ethylenically unsaturated radical of

The term "methacrylamide monomer (or macromer)" refers to a vinylic monomer (or macromer) having an ethylenically unsaturated radical of The term "acrylate monomer (or macromer)" refers to a vinylic monomer (or macromer) having an ethylenically unsaturated radical of The term "methacrylate monomer (or macromer)" refers to a vinylic monomer (or macromer) having an ethylenically unsaturated radical of A "silicone-containing prepolymer" refers to a prepolymer which contains silicone.

A "polysiloxane-containing vinylic monomer (or macromer)" refers to a vinylic monomer (or macromer) containing at least one ethylenically unsaturated group and a divalent radical of in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-(OCH$_2$CH$_2$)$_m$—OR$_3$, in which alk is $C_1$-$C_6$ alkylene divalent radical, $R_3$ is hydrogen or $C_1$-$C_6$ alkyl, and m is an integer of from 1 to 10; and wherein n is an integer of 3 or higher.

The term "fluid" as used herein indicates that a material is capable of flowing like a liquid.

"Molecular weight" of a polymeric material (including monomeric or macromeric materials), as used herein, refers to the number-average molecular weight unless otherwise specifically noted or unless testing conditions indicate otherwise.

As used herein, the term "multiple" refers to three or more.

A "photoinitiator" refers to a chemical that initiates radical crosslinking/polymerizing reaction by the use of light. Suitable photoinitiators known in the art include, without limitation, benzoin methyl ether, diethoxyacetophenone, a benzoylphosphine oxide, 1-hydroxycyclohexyl phenyl ketone, commercially available Darocur® types, and Irgacure® types, preferably Darocur® 1173, and Irgacure® 2959.

A "mold half" is a part of a mold assembly (or mold) for forming an contact lens, in particular a silicone hydrogel contact lens, preferably in the so-called mold or full-mold process. The mold half comprises at least a body part as well as a molding surface, i.e. the lens forming area. In general the lens forming area for a male mold half has a convex shape and the lens forming area for a female mold half has a concave shape. When assembled to a mold, the molding surfaces of the two mold halves form a mold cavity defining the shape of the contact lens between the male and female molding surface. In the present invention the molds are preferably rigid molds, i.e. molds without any substantial deformation during the molding process.

In polymer chemistry, copolymerization is a process of reacting at least two types of monomers together in a chemical reaction to form a three-dimensional network or a polymer chain. Basic principles of copolymerization are for example described in the textbook of B. Tieke; *Makromolekulare Chemie*; Wiley-VCH, 2005.

The Copolymer Equation

The Mayo-Lewis equation or copolymer equation in polymer chemistry describes the distribution of monomers in a copolymer, in particular for a binary copolymer system, i.e. a copolymer obtained from two different monomer components. The equation is derived from theory and thus, as all theories, has some inherent limitations. As it is well known to the person skilled in the art, the underlying theory presumes a relatively high dilution of the monomers in the reaction mixture, as well as a relatively low consumption of the monomers (i.e. about 5 to 10%). Accessibility of remaining (unreacted) monomers and of remaining (unreacted) ethylenically unsaturated groups in the polymer network as a limitation to reaction kinetics at a late stage of the copolymerization reaction is thus not entirely reflected by the underlying theory. Nevertheless, the Mayo-Lewis equation is widely used to describe copolymerization systems and to predict their reaction and composition. Together with the parameters derived therefrom the Mayo-Lewis equation is common general knowledge to the person skilled in the art.

Taking into consideration a monomer mix of two components $M_1$ and $M_2$ and the four different reactions that can take place at the reactive chain end terminating in either monomer (M*) with their reaction rate constants k:

The reactivity ratios are then defined as:

$$r_1 = \frac{k_{11}}{k_{12}} \quad r_2 = \frac{k_{22}}{k_{21}}$$

Accordingly the copolymer equation is given as:

$$\frac{dM_1}{dM_2} = \frac{m_1}{m_2} = \frac{M_1}{M_2} \cdot \frac{r_1 M_1 + M_2}{r_2 M_2 + M_1}$$

The equation gives the copolymer composition at any instant during the polymerization, wherein $M_x$ are molar concentrations of the components.

The parameters $r_1$ and $r_2$ (also called the kinetic copolymerization parameters) represent the probability that a monomer $M_1$ or $M_2$ is attached to the reactive chain end which either carries a $M_1$ or a $M_2$ group.

If, for example $r_1<1$, the monomer $M_2$ is preferably attached to the reactive chain end carrying a $M_1$ unit. For $r_1>1$ it is exactly the opposite. If both parameters are 1, none of the four reactions is preferred, and a copolymer with an ideal statistic distribution of monomers is formed.

From the above equation several limiting cases can be derived:

For $r_1=r_2\gg 1$ with both reactivity ratios very high the two monomers have no inclination to react to each other except with themselves leading to a mixture of two homopolymers.

For $r_1=r_2>1$ with both ratios larger than 1, homopolymerization of component $M_1$ is favored but in the (unfavored) event of a cross-polymerization by $M_2$ the chain-end will continue as such giving rise to block copolymer.

For $r_1=r_2\approx 1$, i.e. with both ratio's around 1, monomer $M_1$ will react as fast with another monomer $M_1$ or monomer $M_2$ and a random copolymer results.

For $r_1=r_2\approx 0$, i.e. with both values approaching zero, the monomers are unable to react in homopolymerization and the result is an alternating polymer For $r_1\gg 1\gg r_2$, i.e. with $r_2$ being much less than 1.0 and $r_1$ being much higher than 1.0 the following occurs: In the initial stage of the copolymerization, monomer $M_1$ is incorporated faster and the copolymer is rich in monomer $M_1$. When this monomer gets depleted, more monomer $M_2$ segments are added. This effect is called composition drift.

DETAILED DESCRIPTION OF EMBODIMENTS

It has now surprisingly been found, that one option to alleviate the shrink effect in the manufacture of contact lenses is to postpone gelation of the polymeric formulation to a point in the course of reaction when most of the monomers (or macromers) have already reacted. The term "gelation" as used herein is defining the instant in time or reaction progress, when a three dimensionally crosslinked network is formed from the polymerizing components of the reactive formulation. Before gelation the reaction mixture is still a viscous fluid and thus capable to flow and compensate for the polymerization shrinkage, whereas after gelation the reaction mixture has become a more or less dimensionally stable molding. The composition of the present invention is providing for a gelation at a late point in the course of reaction.

In polymerizable compositions currently used in the industry, in particular in photo-polymerizable compositions for forming contact lenses, the point of gelation is reached rather early along the reaction coordinate. This is due to the kinetic reaction parameters of the individual components, i.e. the individual polymerizable groups of the reaction mixture, with regard to homopolymerization as well as with regard to copolymerization.

In a typical composition, a mixture of two different types of ethylenically unsaturated reactive groups are used, which are for example methacrylate and acrylamide groups, with for example a methacrylate terminated crosslinker being the only bi-functional component in the formulation. The specific compounds and their corresponding reactive groups are usually selected to make the polymerization and crosslinking process fast enough for being useful in an industrial scale manufacturing process, such as for example the Lightstream™ process, as well as to preferably result in a water containing biphasic hydrogel with high oxygen permeability for advantageous use as a contact lens material.

Kinetic studies now revealed, that said combination of components reaches the point of gelation very early along the reaction coordinate (see FIG. 1), which implies that in the above example the methacrylate terminated crosslinker (i.e. the only bi-functional component in the formulation) is reacting preferentially fast with a growing chain of acrylamide functional groups, whereas the methacrylate functional groups react with each other at a much slower pace. As a result said lens-forming material, although reacting fast enough for an industrial scale manufacturing process, is subject to a rather pronounced shrinkage (see FIG. 1, with 5.1 to 5.4% in Example 6) and prone to delamination from the rigid mold parts.

Without wanting to be bound by the underlying scientific theory, it has now surprisingly been found that postponing the point of gelation to a later point on the reaction coordinate will allow the still viscous and thus flowable material to shrink in the mold cavity and draw in more reactive formulation from the edge of the mold halves, where in a curing process using a spatial limitation of the UV light, a UV-mask prevents light initiated polymerization. Hence, although the total shrinkage of the crosslinking material stays the same, the part effective to induce delamination from the mold surface is reduced. Kinetic reaction parameters describing the copolymerization of the acrylamide functional group and the methacrylate functional group in the above mentioned composition, confirm that a growing chain with an acrylamide group at the end is reacting more likely with a methacrylate group than with acrylamide ($r_1=0.42$), and that a radically active methacrylate end group is more likely reacting with a methacrylate than with an acrylamide ($r_2=2.30$) (the values of $r_1$ and $r_2$ are reported by G. Saini, A. Leoni and S. Franco, in Die Makromolekulare Chimie 146: 165-171 (1971), herein incorporated by reference in its entirety).

Postponing gelation may thus be reached by advantageous selection of the functional groups on the reactive monomers, macromers, and crosslinker(s) of the lens-forming composition, specifically on the crosslinking component(s), which are the bi- or higher functional components of the lens-forming composition.

Therefore, in one aspect the invention provides a lens-forming composition suitable for making contact lenses, in particular silicone hydrogel contact lenses, preferably with a curing method using a spatial limitation of actinic radiation. The composition comprises at least one first vinylic monomer or macromer having one first ethylenically unsaturated group; at least one second vinylic monomer or macromer having one second ethylenically unsaturated group; and at least one crosslinker, which preferably is a low molecular weight crosslinker, with at least one third ethylenically unsaturated group and at least one fourth ethylenically unsaturated group, wherein the first ethylenically unsaturated group is different from the second ethylenically unsaturated group, wherein the third and fourth ethylenically unsaturated groups are either identical or different, wherein at least one of the third and fourth ethylenically unsaturated group is identical to the first ethylenically unsaturated groups, wherein the first ethylenically unsaturated group has a kinetic copolymerization parameter $r_1$ of less than about 1.0, preferably less than about 0.8, more preferably less than about 0.5 relative to the second ethylenically unsaturated group.

In a preferred embodiment, the second ethylenically unsaturated group has a kinetic copolymerization parameter $r_2$ of more than about 1.3, preferably of more than about 1.5 and most preferably more than about 2.0, each relative to the first ethylenically unsaturated group. In another preferred embodiment, the third and fourth ethylenically unsaturated groups are identical.

In a further preferred embodiment, the composition comprises (1) a hydrophilic vinylic monomer; (2) a siloxane-containing vinylic monomer; (3) a polysiloxane-containing vinylic monomer or macromer; and (4) a crosslinker, wherein at least one of the components (1) to (3) contains one first ethylenically unsaturated group, wherein at least one of the components (1) to (3) contains one sole second ethylenically unsaturated group.

In another further preferred embodiment, the second ethylenically unsaturated group is a methacrylate group, the second ethylenically unsaturated group is an acrylamide group, and optionally a third vinylic monomer or macromer comprises either an acrylamide group or a methacrylate group.

In a still further preferred embodiment, the second ethylenically unsaturated group is identical with one of the third and fourth ethylenically unsaturated groups of the crosslinker and has a kinetic copolymerization parameter $r_2$ of more than 1.3, preferably of more than 1.5 and most preferably more than 2.0, each relative to the first ethylenically unsaturated group.

In another aspect, the invention provides a contact lens, in particular a silicone hydrogel contact lens, comprising a cured composition as defined above, as well as the use of a composition as defined above for manufacturing a contact lens, in particular a silicone hydrogel contact lens.

In a further aspect, the invention provides a process for manufacturing a contact lens, in particular a silicone hydrogel contact lens, comprising the steps of providing a mold assembly comprising at least a first and a second mold half; dosing a lens forming material into the first mold half, wherein the lens forming material is a composition as defined in the aspects above; closing the first and second mold halves to form a mold cavity defining at least the first and second surfaces of a contact lens; curing the lens forming material in the mold cavity; opening the first and a second mold halves; removing the contact lens from the first or second mold half. The curing preferably is effected by exposure of the lens forming material in the mold cavity to an actinic radiation and wherein the mold assembly further comprises a mask providing for a spatial limitation of the actinic radiation defining the edge of the contact lens.

It should be understood that although various embodiments including preferred embodiments of the invention may be separately described above, aspects of the various embodiments may be interchanged either in whole or in part or can be combined in any manner and/or used together.

The lens-forming composition of the invention preferably comprises as vinylic monomers or macromers (1) at least one hydrophilic vinylic monomer, preferably selected from N-vinyl pyrrolidone, N-vinyl caprolactam, dimethyl acrylamide (DMA), 2-hydroxyethyl methacrylate (HEMA), 3-hydroxypropyl methacrylate, acrylic acid, methacrylic acid, 4-aminostyrene, 3-methacryloxymethyl-7-oxa-bicyclo[4.1.0]heptane (CHOMA), N-methacryloxyethyl-maleimide (DMI-OMA), glycidyl methacrylate (GMA), ammonium ethyl methacrylate hydrochloride (AEMA) or ammonium propyl methacrylate hydrochloride (APMA), mono ethyleneglycol acrylate, mono ethyleneglycol methacrylate, hydroxy-substituted lower alkyl acrylates and methacrylates, hydroxy-substituted lower alkyl-acrylamides and -methacrylamides, hydroxy-substituted lower alkyl vinyl ethers, 2-acrylamido-2-methylpropanesulfonic acid, most preferably dimethyl acrylamide (DMA); (2) at least one siloxane-containing vinylic monomer, preferably selected from a siloxane-containing (meth)acrylate or (meth)acrylamide monomer, more preferably selected from tris(trimethylsiloxy)-silylpropyl (meth)acrylate, N-[tris(trimethylsiloxy)-silylpropyl](meth)acrylamide, and most preferably N-[tris(trimethylsiloxy)-silylpropyl]acrylamide; (3) at least one polysiloxane-containing vinylic monomer or macromer, such as polydimethylsiloxane segment-containing vinylic monomer or macromer; and further comprises (4) at least one crosslinker with at least two ethylenically unsaturated end groups preferably selected from acrylate or acrylamide or methacrylamide, wherein the at least two ethylenically unsaturated end groups are identical or different and is identical to the first ethylenically unsaturated group, wherein the first ethylenically unsaturated group has a kinetic copolymerization parameter $r_1$ of less than 1.0 relative to the second ethylenically unsaturated group as defined above.

A polysiloxane-containing vinylic monomer or macromer as used in (3) above preferably is a polysiloxane-containing vinylic monomer or macromer prepared according to known procedures, for example, those described in U.S. Pat. Nos. 4,136,250, 4,486,577, 4,605,712, 5,034,461, 5,416,132, and 5,760,100, which are herein incorporated by reference in their entireties. More preferably a polysiloxane-containing vinylic monomer or macromer is a polydimethylsiloxane (PDMS) vinylic monomer macromer, most preferably a PDMS vinylic monomer or macromer as prepared in the examples.

Crosslinkers are compounds having two or more ethylenically unsaturated groups. Low molecular weight crosslinkers are compounds having two or more ethylenically unsaturated groups and having a molecular weight of less than 700 Daltons. Examples of suitable low molecular weight cross-linkers include without limitation tetra(ethyleneglycol) diacrylate, tri(ethyleneglycol) diacrylate, ethyleneglycol diacylate, di(ethyleneglycol) diacrylate, tetraethyleneglycol dimethacrylate, triethyleneglycol dimethacrylate, ethyleneglycol dimethacrylate, di(ethyleneglycol) dimethacrylate, trimethylopropane trimethacrylate, pentaerythritol tetramethacrylate, bisphenol A dimethacrylate, vinyl methacrylate, methylene bisacrylamide (MBA), ethylenediamine dimethyacrylamide, glycerol dimethacrylate, triallyl isocyanurate, triallyl cyanurate, allylmethacrylate, and combinations thereof. Preferred crosslinkers are tetra(ethyleneglycol) diacrylate, tri(ethyleneglycol) diacrylate, ethyleneglycol diacylate, di(ethyleneglycol) diacrylate, methylene bisacrylamide (MBA), triallyl isocyanurate, or triallyl cyanurate, most preferably methylene bisacrylamide (MBA).

It is generally preferred that low molecular weight crosslinkers are used in the lens-forming composition of the present invention.

The amount of the crosslinker is expressed in the weight content with respect to the total polymer and is preferably in the range from 0.05% to 4%, and more preferably in the range from 0.1% to 2% and most preferably in the range from 1.0% to 1.6%.

In accordance with the present invention, a lens forming composition can further comprise various components, such as photoinitiators, inhibitors, fillers, visibility tinting agents (e.g., dyes, pigments, or mixtures thereof), bioactive agents, leachable lubricants, and the like, as generally known to a person skilled in the art.

In accordance with the present invention, a lens forming composition comprises at least one photoinitiator in an amount of from 0.05% to 2.0% by weight; preferably form 0.5 to 1.5% by weight, most preferably about 1.0% by weight. Preferred photoinitiators are Darocur® 1173, Darocur® TPO, Irgacure® 819, and Irgacure® 2959, which are commercially available.

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-di methylacrylamide, polyacrylic acid, poly-2-ethyl oxazoline, heparin polysaccharides, polysaccharides, and mixtures thereof. The number-average molecular weight Mn of the non-crosslinkable hydrophilic polymer is preferably from 5,000 to 500,000, more preferably from 10,000 to 300,000, even more preferably from 20,000 to 100,000.

In accordance with the invention, a suitable lens-forming material is a composition, which can be a solution or a melt at a temperature from about 20° C. to about 85° C. Preferably, a lens-forming material is a solution of all desirable components in water, or an organic solvent, or a mixture of water and one or more organic solvents.

A lens-forming composition of the invention can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Preferred solvents are 1-propanol, 2-propanol, 1-pentanol, 1-hexanol, 2-methyl-1-pentanol, the most preferred solvent is 1-propanol.

In a preferred embodiment, the lens-forming composition of the invention comprises: (1) from about 5% to about 60% by weight, preferably from about 10% to about 50% by weight, even more preferably from about 15% to about 45% by weight, even more preferably from about 20% to about 40% by weight, of a hydrophilic amide-type vinylic monomer; (2) from about 5% to about 50% by weight, preferably from about 10% to about 40% by weight, more preferably from about 15% to about 30% by weight, of a siloxane-containing acrylate or acrylamide or methacrylamide vinylic monomer; (3) from about 5% to about 50%, preferably from about 10% to about 40% by weight, more preferably from about 15% to about 35% by weight, of a polysiloxane-containing vinylic monomer or macromer; (4) from 0.05% to 4%, preferably from 0.1% to 2% and more preferably from 1.0% to 1.6% of a crosslinker, preferably a low molecular weight crosslinker as defined above; and (5) from about 0.05% to about 1.5% by weight, preferably from about 0.1% to 1.3% by weight, more preferably from about 0.5% to about 1.1% by weight, of a photoinitiator.

The foregoing range combinations are presented with the proviso that the listed components and any additional components add up to 100% by weight.

In accordance with the invention, the lens-forming composition can be introduced (dispensed) into a cavity formed by a mold according to any known methods. Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and is in direct contact with lens-forming material. Preferably the edge of the contact lens is formed by a spatial limitation of the actinic radiation used for crosslinking the lens forming material.

After the lens-forming composition is dispensed into the mold, it is polymerized/crosslinked to produce a contact lens. Crosslinking/polymerizing may be initiated by exposing the monomer mixture in the mold to actinic radiation to cure the polymerizable components in the composition. The crosslinking according to the invention may be effected in a very short time, e.g. in about 120 seconds, preferably in about 80 seconds, more preferably in ≤50 about seconds, even more preferably in about 30 seconds, and most preferably in 5 to 30 seconds. Preferably, the spatial limitation of the actinic radiation may be provided for by a mask.

Opening of the mold so that the molded lens can be removed from the mold may take place in a manner known per se. Optionally, the molded contact lens can be subject to one or more extraction processes to remove unpolymerized vinylic monomeric or macromeric components. The extraction solvent can be any solvent known to a person skilled in the art. Examples of suitable extraction solvent are those described above for preparing lens forming compositions. After extraction, lenses can be hydrated in water or an aqueous solution of a wetting agent (e.g., a hydrophilic polymer).

Finally, the molded contact lenses can be subject to further processes, such as, for example, surface treatment (for example, such as, plasma treatment, chemical treatments, the grafting of hydrophilic monomers or macromers onto the surface of a lens, layer-by-layer coating, etc.); packaging in lens packages with a packaging solution which can contain about 0.005% to about 5% by weight of a wetting agent (e.g., a hydrophilic polymer as described above) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization; and the like.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Preparation of Chain-Extended Polydimethylsiloxane (CE-PDMS) Crosslinker with Two Terminal Methacrylate Groups (CE-PDMS Crosslinker)

In the first step, α,ω-bis(2-hydroxyethoxypropyl)-polydimethylsiloxane (Mn=2000, Shin-Etsu, KF-6001A) is capped with isophorone diisocyanate by reacting 49.85 g of α,ω-bis(2-hydroxyethoxypropyl)-polydimethylsiloxane with 11.1 g isophorone diisocyanate (IPDI) in the presence of 0.063 g of dibutyltindilaurate (DBTDL). The reactor is kept for 2.5 h at 45° C., forming IPDI-PDMS-IPDI. In the second step, 164.8 g of α,ω-bis(2-hydroxyethoxypropyl)-polydimethylsiloxane (Mn=3300, Shin-Etsu, KF-6002A) are added to the IPDI-PDMS-IPDI solution to which has been added an additional 0.063 g of DBTDL. The reactor is held for 3.5 h at 55° C., forming HO-PDMS-IPDI-PDMS-IPDI-PDMS-OH. In the third step, the terminal hydroxyl-groups are capped with methacryloyloxyethyl groups by addition of 7.77 g of isocyanatoethylmethacrylate (IEM) and an additional 0.063 g of DBTDL. The reaction is kept for 4 h at 25° C. forming IEM-PDMS-IPDI-PDMS-IPDI-PDMS-IEM.

Example 2

Preparation of Polydimethylsiloxane (PDMS) Vinylic Macromer with One Sole Terminal Methacrylate Group ω-(2-hydroxyethoxypropyl)-polydimethylsiloxane (Mn=1600, Gelest, Monocarbinol MCR-C22) is capped with methacryloyloxyethyl groups by reacting 37.88 g of ω-(2-hydroxyethoxypropyl)-polydimethylsiloxane with 7.77 g of isocyanatoethylmethacrylate (IEM) and an additional 0.063 g of DBTDL, forming IEM-PDMS.

Example 3 (Comparative)

Preparation of a Lens Forming Material (Formulation A)

32% CE-PDMS Macromer Crosslinker (prepared according to Example 1 above)
20% TRIS-acrylamide which is N-[tris(trimethylsiloxy)-silylpropyl]acrylamide
23% DMA, which is N,N-dimethylacrylamide
2.0% Darocur® 1173, a photoinitiator
23% 1-propanol Example 4 (Comparative)

Preparation of a Lens Forming Material (Formulation B)

31.5% IEM-PDMS Macromer (prepared according to Example 2 above)
20.5% TRIS-acrylamide which is N-[tris(trimethylsiloxy)-silylpropyl]acrylamide
22% DMA, which is N,N-dimethylacrylamide
1% EGDMA, which is ethyleneglycol dimethacrylate (a low molecular weight crosslinker)
1.0% Darocur® 1173, a photoinitiator
23.5% 1-propanol Example 5

Preparation of a Lens Forming Material (Formulation C)

31.5% IEM-PDMS Macromer (prepared according to Example 2 above)
20.5% TRIS-acrylamide which is N-[tris(trimethylsiloxy)-silylpropyl]acrylamide
21.4% DMA, which is N,N-dimethylacrylamide
1.6% MBA, which is methylenebisacrylamide (a low molecular weight crosslinker)
1.0% Darocur® 1173, a photoinitiator
23.5% 1-propanol Example 6

Photorheology Studies

Photorheology studies are carried with formulations A, B, and C prepared in Examples 3-5. Photorheology measurements are conducted on a modified RheoStress 600 Rheometer, manufactured by HAAKE, to measure shear modulus. Shear modulus is recorded through using a parallel plate arrangement, wherein the upper plate is BK7 glass and the base plate is quartz glass, through which UV irradiation from a light source can pass and be absorbed by a photoinitiator to form reactive species that will initiate free radical crosslinking polymerization. The light source is a Hamamatsu LC5 UV lamp, fitted with a Hamamatsu Mercury-Xenon bulb (L10841). Light from the source is directed down a light guide and through a TM 328 cut-off filter manufactured by Tafelmaier Dünnschicht Technik GmbH, before being impinged on the quartz plate. The intensity of light that passes through this optical arrangement is measured with a UV sensor, manufactured by ESE/QIAGEN (UV Sens 1173 CV). The UV sensor is calibrated to the manufacture's standard. Intensity values are given in mW/cm$^2$ and all cure energies quoted are the sum Intensity (mW/cm$^2$)×time (seconds) and are given in milli Joules/cm$^2$ (mJ/cm$^2$). The oscillation frequency of the photorheometer is set at 10 Hz and viscosity changes measured in a time resolved manner. Measurements are typically terminated 60 seconds after the cessation of increase in viscosity.

The photorheology experiments reveal that gelation occurs within less than 19 seconds for formulation A and within 22 seconds for formulation B, respectively, each after the inhibition time under UV irradiation. This leads to a complete reaction after about 25 seconds.

In the experiments, the UV light intensity is at 15.7 mW/cm$^2$. The point of gelation is determined as crossover of G' and G" in a dynamical mechanical response measurement of the sample under UV irradiation. The reaction shrinkages for formulation A and formulation B are determined to be about 5.2% and about 5.1% at average respectively. The reaction shrinkage upon photocrosslinking is determined using a photorheometer and measuring the reduction in the sample thickness. The individual results are shown in FIG. 1.

For formulation C gelation occurs at about 38 seconds after the inhibition time under UV irradiation. The reaction shrinkage for formulation C is determined to be 3.5% at average. For the individual results see FIG. 3. This represents 33% less than the reaction shrinkage for formulations A and B, respectively.

Figure 1:
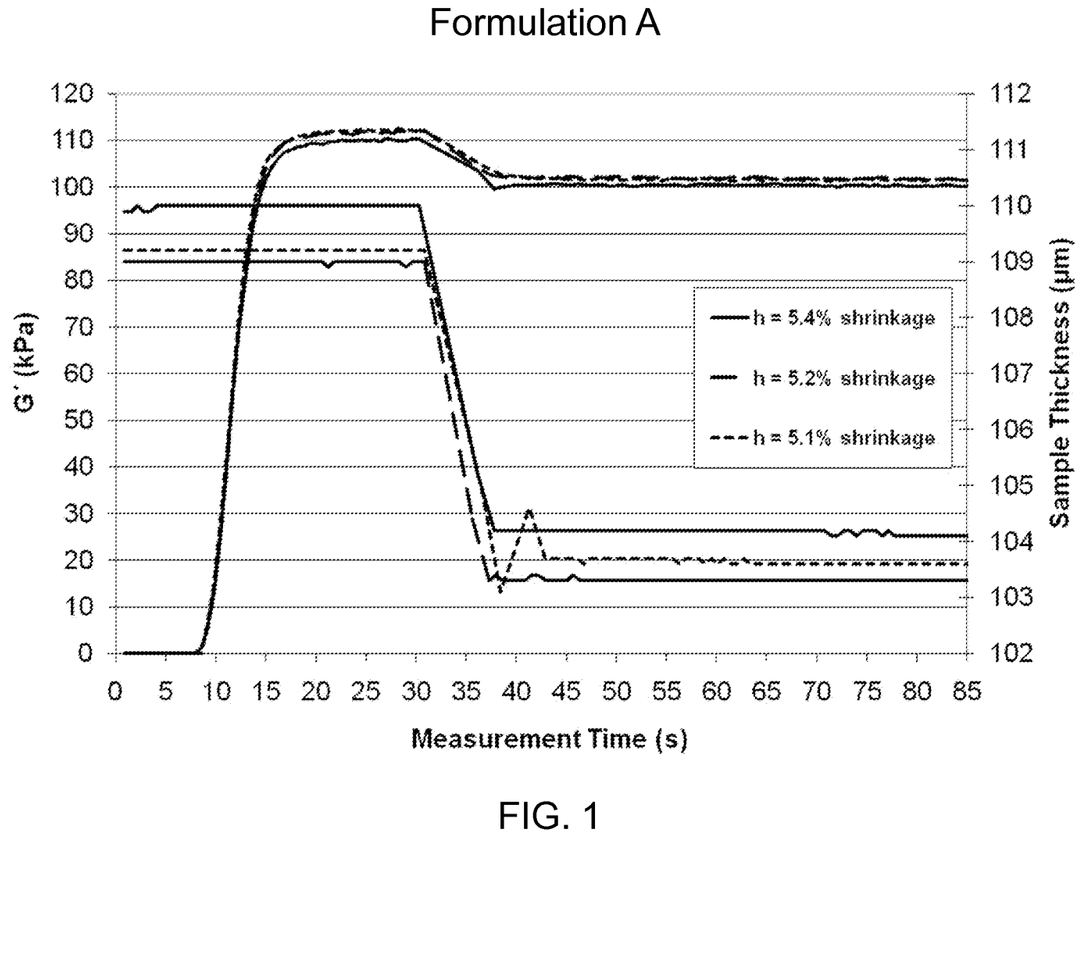
FIG. 1 is showing photocure kinetic results ($G'=f(t)$) as well as the change in sample thickness over time for samples prepared from lens-forming material of Example 3.
Figure 2:
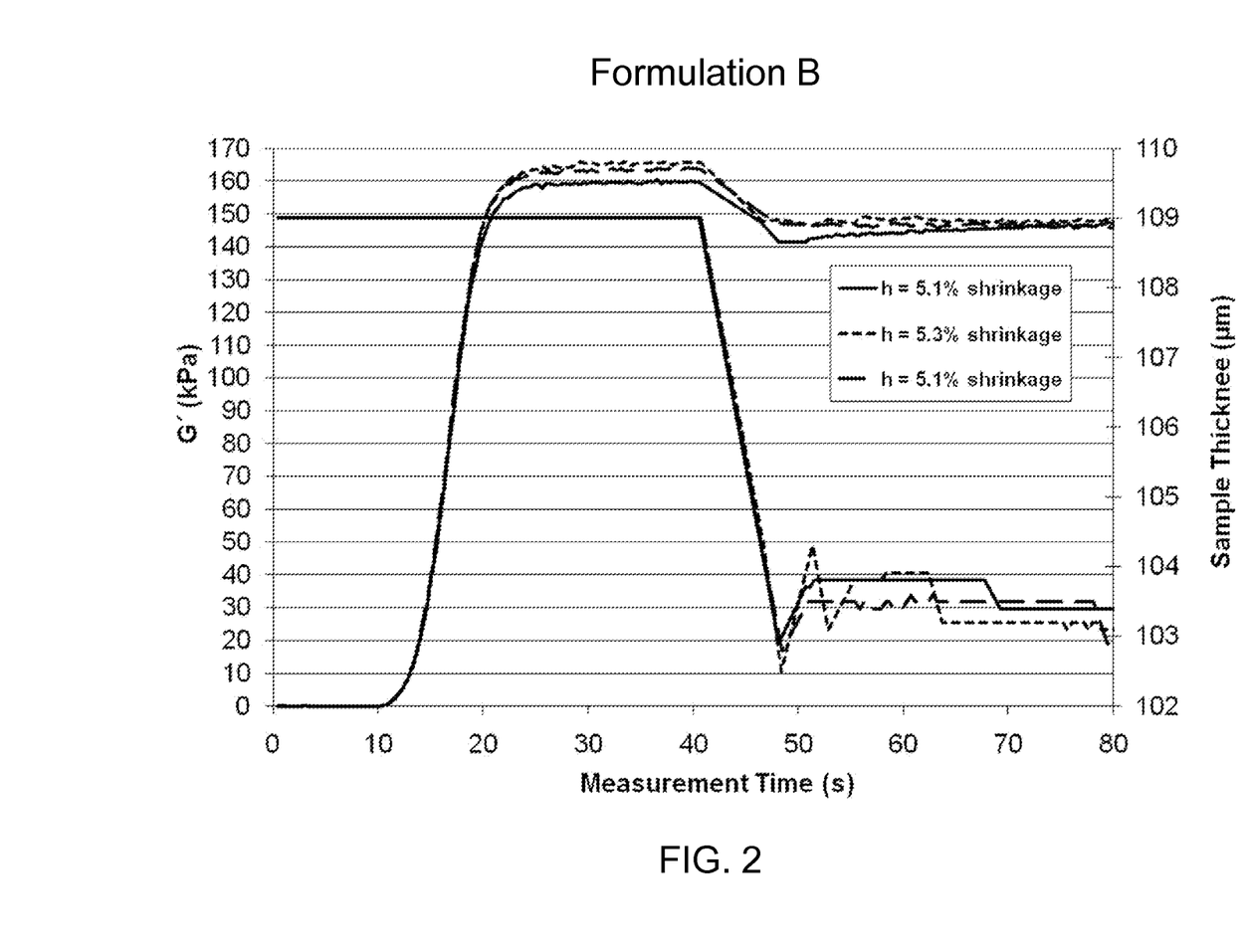
FIG. 2 is showing photocure kinetic results ($G'=f(t)$) as well as the change in sample thickness over time for samples prepared from lens-forming material of Example 4.
Figure 3:
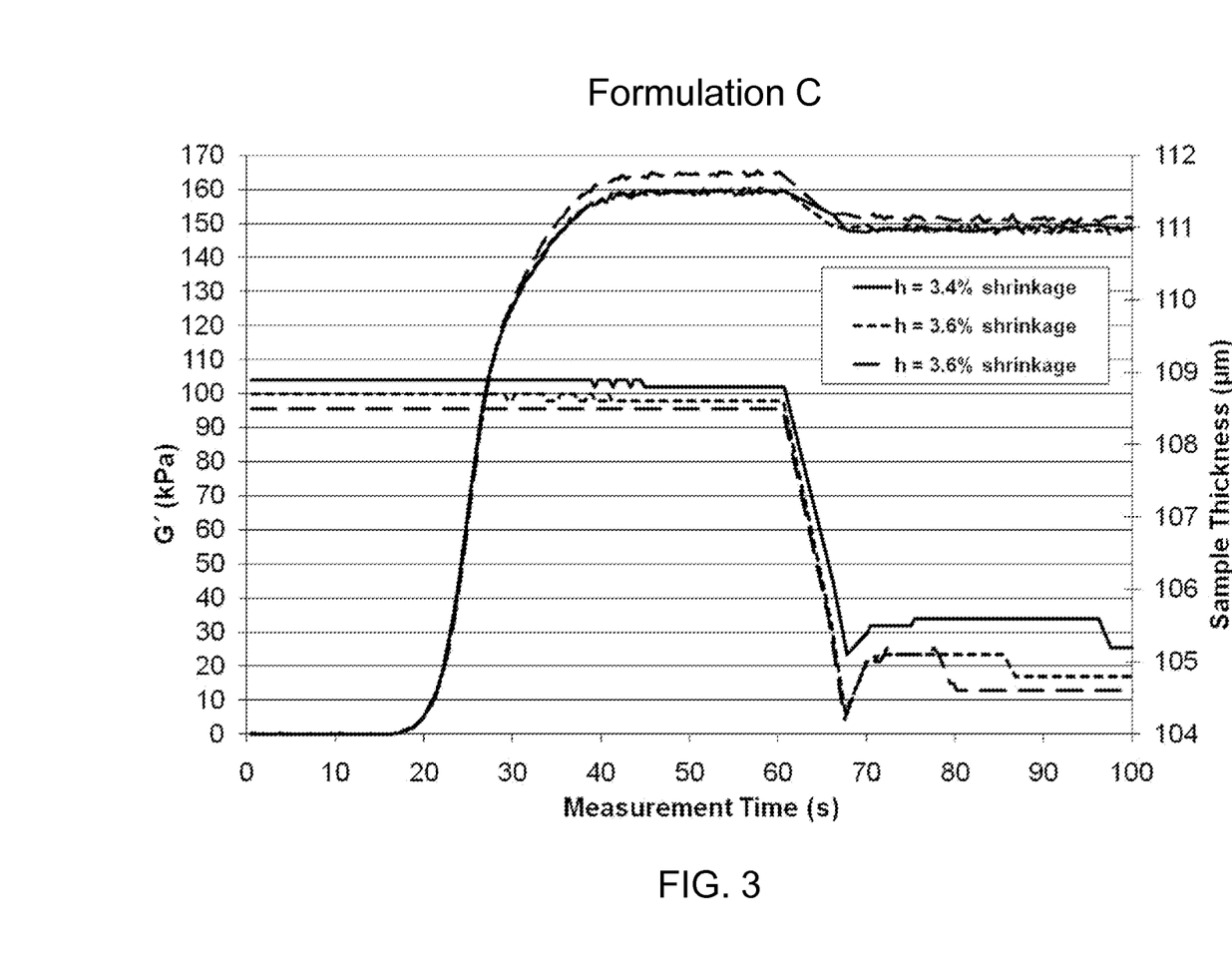
FIG. 3 is showing photocure kinetic results ($G'=f(t)$) as well as the change in sample thickness over time for samples prepared from lens-forming material of Example 5.

The results of the photocure kinetics (G'=f(t)) as well as the change in sample thickness ("measurement gap" before and after cure) determined above are depicted in FIGS. 1 to 3 for samples prepared from lens-forming material of Examples 3, 4 and 5, respectively.

Example 7

Preparation of Lenses

Female portions of rigid lens molds are filled with about 50 microliters of a lens-forming material prepared in Examples 3, 4 and 5 above, and the molds are closed with the male portion of the rigid lens molds (base curve molds). Contact lenses are obtained by curing the closed molds for about 25 seconds with a UV light intensity of about 15.7 mW/cm$^2$ at a wavelength cut-off at 328 nm. All three formulations A, B and C after crosslinking provided about the same shear modulus (G' in kPa) of about 150 kPa for the sample lenses.

The invention claimed is:

1. A process for manufacturing a contact lens, comprising the steps of:
   (1) providing a mold assembly comprising at least a first and a second mold half, wherein the mold assembly further comprises a mask providing for a spatial limitation of the actinic radiation defining the edge of the contact lens;
   (2) dosing a lens forming material into the first mold half, wherein the lens forming material comprises
      (a) from about 5% to about 60% by weight of a hydrophilic amide-type vinylic monomer,
      (b) from about 5% to about 50% by weight of a siloxane-containing acrylamide vinylic monomer,
      (c) from about 5% to about 50% by weight of a polysiloxane-containing vinylic monomer or macromere comprising at least one methacrylate group, and
      (d) from 0.05% to 4% by weight of methylene bisacrylamide;
   (3) closing the first and second mold halves to form a mold cavity defining at least the first and second surfaces of a contact lens;
   (4) curing, under a spatial limitation of the actinic radiation, the lens forming material in the mold cavity; and
   (5) opening the first and a second mold halves; and removing the contact lens from the first or second mold half.

2. The process of claim 1, wherein the hydrophilic amide-type vinylic monomer is N,N-dimethylacrylamide.

3. The process of claim 2, wherein the siloxane-containing acrylamide vinylic monomer is N-[tris(trimethylsiloxy)-silylpropyl]acrylamide.

4. The process of claim 3, wherein the polysiloxane-containing vinylic monomer or macromere is a polydimethylsiloxane vinylic monomer or macromer.

5. The process of claim 2, wherein the polysiloxane-containing vinylic monomer or macromere is a polydimethylsiloxane vinylic monomer or macromer.

6. The process of claim 1, wherein the siloxane-containing acrylamide vinylic monomer is N-[tris(trimethylsiloxy)-silylpropyl]acrylamide.

7. The process of claim 6, wherein the polysiloxane-containing vinylic monomer or macromere is a polydimethylsiloxane vinylic monomer or macromer.

8. The process of claim 1, wherein the polysiloxane-containing vinylic monomer or macromere is a polydimethylsiloxane vinylic monomer or macromer.

* * * * *